W. C. HEDGCOCK.
LUBRICATOR FOR AIR CYLINDERS OF LOCOMOTIVE AIR BRAKE PUMPS.
APPLICATION FILED APR. 14, 1911.

1,049,478. Patented Jan. 7, 1913.

WITNESSES:

INVENTOR
William C. Hedgcock
BY
Munday, Evarts, Adcock & Clarke
his ATTORNEY

UNITED STATES PATENT OFFICE.

WILLIAM CLIFTON HEDGCOCK, OF LOUISVILLE, KENTUCKY.

LUBRICATOR FOR AIR-CYLINDERS OF LOCOMOTIVE-AIR-BRAKE PUMPS.

1,049,478.	Specification of Letters Patent.	Patented Jan. 7, 1913.

Application filed April 14, 1911. Serial No. 621,017.

*To all whom it may concern:*

Be it known that I, WILLIAM C. HEDGCOCK, a citizen of the United States, residing in Louisville, in the county of Jefferson and State of Kentucky, have invented a new and useful Improvement in Lubricators for Air-Cylinders of Locomotive-Air-Brake Pumps, of which the following is a specification.

My invention relates to sight-feed or other lubricators for lubricating the air cylinders of locomotive air brake pumps; and the objects of my invention, are, first, to provide a valve which will deliver but a certain desired quantity of oil with each revolution thereof, and, second, to provide a valve which requires constant manipulation by the operator to enable the lubricator to feed, the feed being prevented when the valve is not being moved by the operator, thus preventing excess feed of the oil and consequent injury to the air brake equipment. I attain these objects by the arrangements illustrated in the accompanying drawing, in which—

Figure 1:
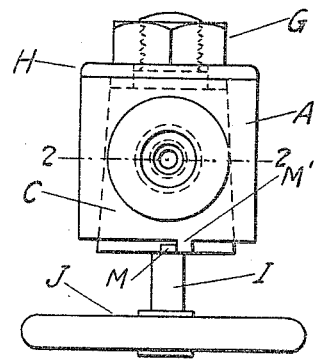
Figure 2:
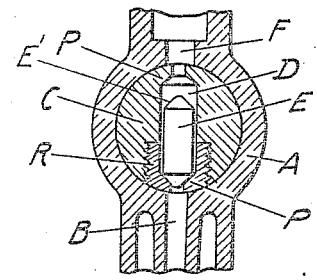
Figure 3:
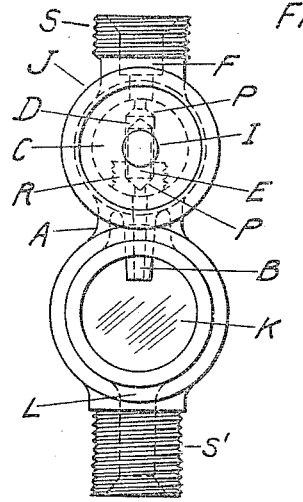

Figure 1 is a plan view of a lubricator valve embodying my improvements. Fig. 2 is a sectional view of the structure shown in Fig. 1, and taken on the line 2—2 thereof, and Fig. 3 is a side elevation of the complete sight feed lubricator.

The main or body part of the lubricator is designated by the reference A and is provided with a rotary plug valve C, the latter having a hole or measuring chamber D extending therethrough in which is mounted the gravity operated, freely slidable plunger E, the latter preferably having conical ends E¹ adapted to coöperate with similarly shaped seats P in the opposite ends of the hole D. As shown in the drawing, the rotary plug valve C has one of its valve seats P formed in a removable screw threaded plug R, this plug R being provided so that the plunger E may be removably retained in the valve, and if desired, interchanged for other plugs of different size, whereby to vary the amounts of the oil being fed.

The oil is supplied from a feed tank (not shown) through an oil supply opening F which, as shown in the drawing, is in vertical alinement with the oil feed nozzle or opening B. The valve C is adapted to be rotated as by means of a handle J secured on a stem I extending from the valve C, and the amount of rotation of the valve may be limited as by means of a pair of stops M and M¹ formed respectively on the valve C and the main or body part of the lubricator A. For retaining the plug valve C in place, the same is provided with a screw threaded extension having a nut G mounted thereon, between which and the body of the lubricator A is placed a washer H. The lubricator is also preferably provided with a sight feed glass K, positioned below the feed nozzle B, so that the oil or other lubricant in dropping from the nozzle B into the opening L in the bottom of the lubricator may be visible. For conveniently attaching the lubricator to the pipe leading to the air cylinder, the lower part of the body of the lubricator is provided with a screw threaded portion S¹, and for connecting the lubricator to the feed pipe from the oil supply, another screw threaded portion S is provided at the upper end thereof.

In operation, the oil will feed through the oil supply opening F and a certain quantity will be caught and retained in the opening D in the rotary valve C and will be prevented from discharging into the feed nozzle B on account of the plug E being seated on one of the seats P, the plug E being operated upon both by the pressure of the oil from the tank and also by gravity. As the valve C is being rotated 180 degrees, the supply of oil through the opening F will be cut off until the opening D is again in alinement with the inlet F and outlet opening B, whereupon the plug E will discharge the measured quantity of oil in the opening D, and after discharging this measured quantity, will prevent the further discharge from the oil supply tank and the valve will again receive a quantity of oil which may be discharged upon another turning of the valve a half revolution. The plunger or plug E may be supplied of various lengths, as desired or required, to feed different measured quantities of lubricant at each turn of the valve. By simply substituting shorter or longer plungers, any desired quantity of lubricant may be discharged at each movement of the valve.

I claim:—

1. In a lubricator, the combination with a body having a supply opening and a discharge opening, of a rotary valve having a passage therethrough, a sliding gravity actuated plunger fitting in said passage of the valve, said valve having seats at the opposite ends of said passage therein for engagement with said plunger to cause the plunger to alternately close the opposite ends of said passage, substantially as specified.

2. In a lubricator, the combination with a body having a supply opening and a discharge opening, of a rotary valve having a passage therethrough, a sliding gravity actuated plunger fitting in said passage of the valve, said valve having seats at the opposite ends of said passage therein for engagement with said plunger to cause the plunger to alternately close the opposite ends of said passage, said valve being provided with a separate piece plug in which one of said seats is formed, substantially as specified.

3. In a lubricator, the combination with a body having a supply opening and a discharge opening, of a rotary valve having a passage therethrough, said passage having contracted ends, a plunger fitting in said passage and adapted to alternately close the contracted ends of said passage when brought adjacent to the discharge opening in said body, said plunger being adapted to slide in said passage under pressure of the lubricant from the supply orifice, substantially as specified.

WILLIAM CLIFTON HEDGCOCK.

Witnesses:
PEARL ABRAMS,
H. M. MUNDAY.